March 4, 1969  H. S. PARECHANIAN ET AL  3,430,898

LEADING EDGE FOR HYPERSONIC VEHICLE

Filed May 1, 1967

INVENTORS.
HAIG S. PARECHANIAN and
JEROME C. SCHUTZLER
BY H. H. Losche
Paul S. Collignon
Attorneys

United States Patent Office 3,430,898
Patented Mar. 4, 1969

3,430,898
LEADING EDGE FOR HYPERSONIC VEHICLE
Haig S. Parechanian and Jerome C. Schutzler, Los Angeles, Calif., assignors, by mesne assignments, to the United States of America as represented by the Secretary of the Navy
Filed May 1, 1967, Ser. No. 635,975
U.S. Cl. 244—123                                    1 Claim
Int. Cl. B64c 3/28, 3/36

ABSTRACT OF THE DISCLOSURE

A leading edge for a hypersonic vehicle having a plurality of short ceramic segments each with an enlarged rounded surface on the leading edge, a reduced radius on the trailing edge, and a reduced thickness middle portion, and a metal support member having lips for providing a compressive load on said reduced thickness middle portion of said short ceramic segments.

Background of the invention

The present invention relates to a leading edge construction for an aerial vehicle and more particularly to a nonmetallic leading edge for an aerial vehicle operating at hypersonic velocities.

The leading edges of the lifting surfaces of an aerial vehicle moving at hypersonic speeds within the earth's atmosphere, even at very high altitudes where atmospheric density is minimal, are subject to extremely severe aerodynamic heating. The region of stagnation along the leading edge of the aerodynamic surfaces of the hypersonic vehicle is the most critically heated portion of these surfaces. The practical requirement for providing a leading edge construction capable of withstanding the temperatures developed thereon in hypersonic flight, which may be in excess of several thousand degrees Fahrenheit, has been seriously considered only in the last few years, however, in connection with the commencement of studies of the design of hypersonic re-entry vehicles from the structural engineering viewpoint.

One heretofore suggested method for providing a leading edge capable of withstanding elevated temperature contemplates the modification of generally conventional metallic wing leading edge structures of the type found in present day subsonic and low supersonic aircraft to include a leading edge member formed of a metal exhibiting superior elevated temperature structural properties, such as molybdenum or columbium, and which is made adeqately massive to provide a heat sink capability with sufficient conduction of heat in cooler regions aft to reduce the maximum temperatures at the stagnation point. It will be apparent, however, that such metal leading edge members must be coated with a suitable heat resistant material to provide protection for the base metal from oxidation. The use of such metal leading edge members, therefore, is considered disadvantageous not only from the standpoint of the severe weight penalty inherent therein, but also in that maximum allowable temperatures at the stagnation point are unduly limited in order to prevent damage to the coating and consequent rapid destruction of the leading edge member by oxidation.

It has also been proposed that leading edges for hypersonic vehicles of the conventional sheet metal type of construction be utilized, with the added provision of an ablation shield to afford thermal protection of the metallic structure. This scheme, however, is considered undesirable, since a substantial mass of ablative material concentrated at the region of stagnation of the leading edge would be required, and leading edge contour changes during operation of the vehicle due to ablation of this material would cause severe aerodynamic penalities. Such an ablation shield, moreover, would be subject to costly and time consuming restoration after completion of every operational mission of the vehicle.

One further scheme suggested in the past as a solution of the outlined problem involves the introduction of a fluid coolant flow through a conventional metallic leading edge structure to remove heat therefrom by conduction, but this type of cooling system would unduly add to the mass of the vehicle the weight of the coolant and the plumbing required therefor, as well as invite potential trouble resulting from possible failure of any one of the numerous valve mechanisms which would be required in such a system.

Summary of the invention

The present invention relates to an improved assembly of a leading edge this is comprised of a plurality of short ceramic segments that are secured to a metallic supporting structure. Each ceramic segment is provided with a rounded outer surface defining the leading edge of the surface and a reduced thickness middle portion. The metallic supporting structure is provided with an elongated slot that forms a pair of lips which engage with the reduced thickness middle section to apply a compressive force which retains the ceramic segments in position.

It is therefore a general object of the present invention to provide an improved leading edge construction for a surface of a hypersonic aerial vehicle.

Another object of the present invention is to provide an improved leading edge construction capable of withstanding severe aerodynamic heating.

Other objects and advantages of the present invention will be readily appreciated as the same becomes better understood by reference to the following detailed description when considered in connection with the accompanying drawing.

Description of the preferred embodiment

Figure 1:
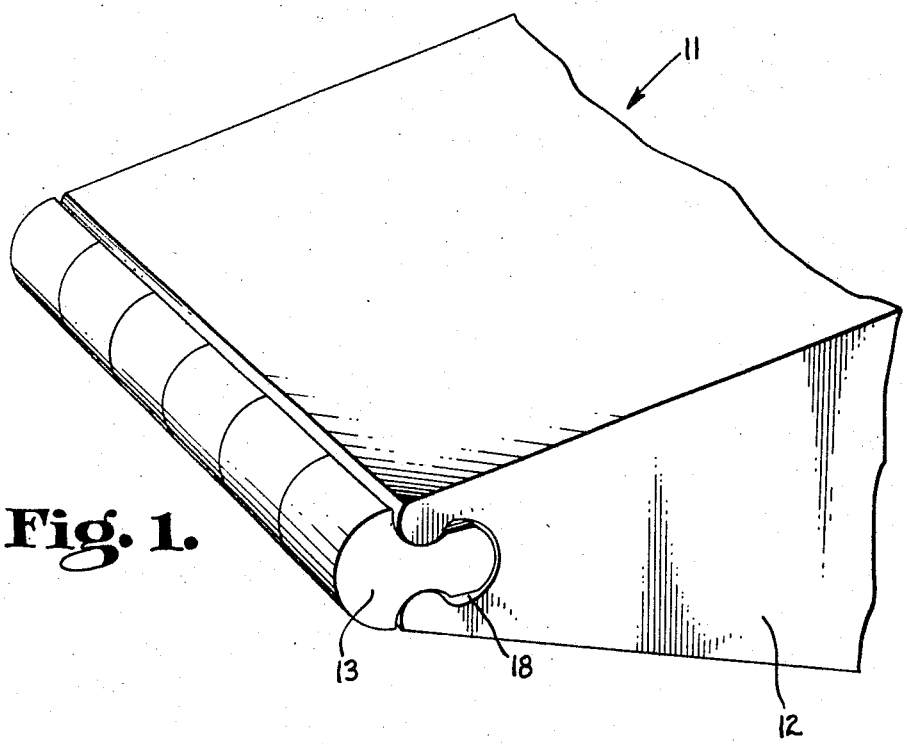
FIGURE 1 is a partial perspective view of a preferred embodiment of the present invention.

Referring now to the drawing, there is shown in FIGURE 1, a leading edge generally designated by the reference numeral 11. By way of example, the leading edge 11 might form part of a lifting surface of a hypersonic aerial vehicle. The lifting surface is comprised of a metallic support member 12 which supports a plurality of ceramic front edges 13. By way of example, ceramic front edges 13 might be comprised of hafnium carbide.

Each ceramic front edge 13 is provided with an enlarged forward end 14 which has a rounded forward surface 15 which is frequently used for hypersonic hot leading edge sections. This rounded forward surface 15 is, by no means, the only configuration acceptable for leading edges such as blunt leading edges and other configurations have been used under a wide range of thermoaerodynamic conditions. The aft end 16 of each ceramic edge 13 is approximately one-half the diameter of the forward end 14 and between the forward end 14 and the aft end 16 there is a reduced thickness section 17 that is used as a gripping surface. The top and bottom surfaces of reduced thickness section 17 are each provided with a radius that blends into the forward and aft ends.

Figure 2:
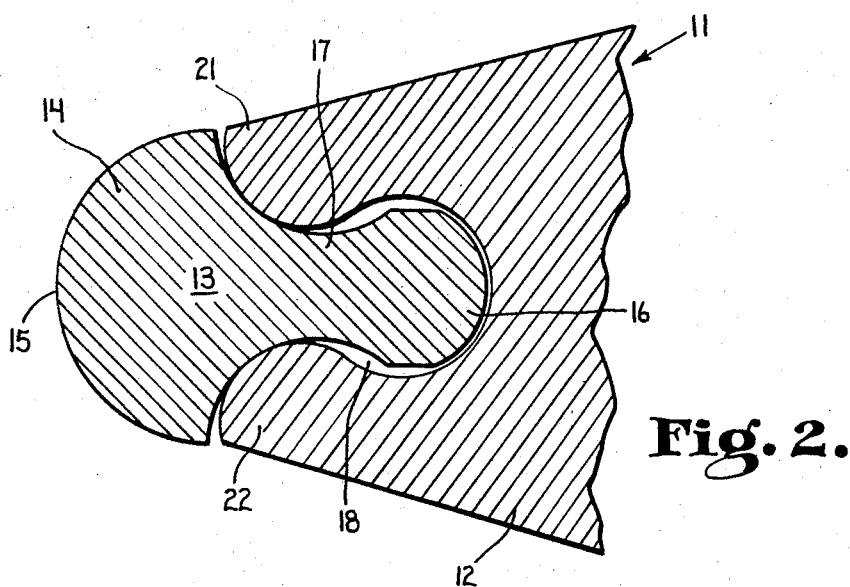
FIGURE 2 is a cross-sectional view of the embodiment shown in FIGURE 1 of the drawing.

As best shown in FIGURE 2 of the drawing, metallic support member 12 is provided with an elongated slot 18 along a span wise plane that forms top and bottom lips 21 and 22. Top lip 21 is provided with an inside radius that conforms to the top curved surface of reduced thickness section 17 and, likewise, bottom lip 22 is provided with an inside radius that conforms to the bottom curved surface of reduced thicknes section 17. The dimensions of lips 21 and 22 and the reduced thickness section 17 are such that lips 21 and 22 apply compression to the reduced thickness section 17 thereby firmly attaching ceramic front edge 13 in abutting relation to metallic support member 12. This manner of attachment minimizes stress concentrations and at the same time provides automatic thermal expansion relief.

It can thus be seen that the present invention provides an improved construction for a leading edge of an aerial vehicle capable of attaining hypersonic speeds within the earths atmosphere. As ceramic materials are, in general, very brittle and of low strength, the compressive means of attaching the ceramic to the metallic support reduces the tendency of the ceramic to fracture, and at the same time provides automatic thermal expansion relief.

Obviously many modifications and variations of the present invention are possible in the light of the above teachings.

We claim:
1. A leading edge for a hypersonic vehicle comprising:
a metallic member having an elongated slot along a spanwise plane forming curved top and curved bottom lips,
a plurality of ceramic leading edge segments having an enlarged forward end with a substantially rounded forward surface, an aft end, and a reduced thickness section between said forward and aft ends, said reduced thickness section having arcuated top and bottom surfaces which conform, respectively, to said curved top and bottom lips, said ceramic leading edge segments being arranged in abutting relation with said metallic member, and said curved top and curved bottom lips of said metallic member engaging, respectively, said arcuated top and bottom surfaces of said reduced thickness section of each said ceramic leading edge segment thereby connecting said ceramic leading edge segments to said metallic member.

References Cited

UNITED STATES PATENTS

| | | | |
|---|---|---|---|
| 2,643,076 | 6/1953 | Hurel | 244—123 X |
| 3,028,128 | 4/1962 | Friedrich | 244—124 X |

OTHER REFERENCES

Astronautics and Aerospace Engineering, pp. 27, 28, June 1963.

MILTON BUCHLER, *Primary Examiner.*

THOMAS W. BUCKMAN, *Assistant Examiner.*

U.S. Cl. X.R.

244—117